Figure 1:
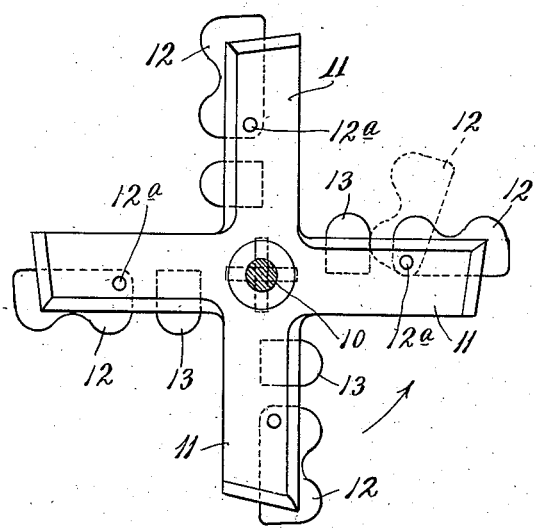

H. SLETTEN & A. N. LIDELL.
DEVICE FOR SINKING FOUNDATION TUBES.
APPLICATION FILED MAY 5, 1915.

1,172,065.

Patented Feb. 15, 1916.

Witnesses.
A. H. Opsahl.
E. C. Skinkle

Inventors.
Henry Sletten.
Alex N. Lidell.
By their Attorneys.
Williamson Merchant

UNITED STATES PATENT OFFICE.

HENRY SLETTEN AND ALEXANDER N. LIDELL, OF MINNEAPOLIS, MINNESOTA.

DEVICE FOR SINKING FOUNDATION-TUBES.

1,172,065. Specification of Letters Patent. Patented Feb. 15, 1916.

Original application filed June 12, 1914, Serial No. 844,670. Divided and this application filed May 5, 1915. Serial No. 25,980.

*To all whom it may concern:*

Be it known that we, HENRY SLETTEN and ALEXANDER N. LIDELL, citizens of the United States, residing at Minneapolis, in the county of Hennepin and State of Minnesota, have invented certain new and useful Improvements in Devices for Sinking Foundation-Tubes; and we do hereby declare the following to be a full, clear, and exact description of the invention, such as will enable others skilled in the art to which it appertains to make and use the same.

Our present invention has for its object to provide an improved boring tool, and to such ends, generally stated, it consists of the novel devices and combinations of devices hereinafter described and defined in the claims.

The present application is filed as a division of our earlier application S. N. 844,670, filed of date, June 12, 1914, and allowed of date, March 18, 1915, and entitled "Device for sinking foundation tubes."

This boring tool, while especially adapted for use in connection with apparatus such as described and claimed in our said earlier application, is, nevertheless, capable of a much wider range of use and is particularly adapted for the boring of large holes through sand (either quick sand or dry sand), through clay, and through other earth formations that are comparatively free from large rocks.

In the accompanying drawings which illustrate the invention, like characters indicate like parts throughout the several views.

Figure 2:
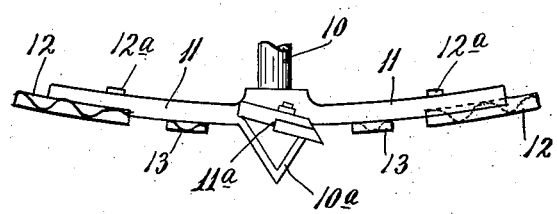

Referring to the drawings:

Figure 1 is a plan view of the improved boring tool; and Fig. 2 is a side elevation of the same.

The improved boring tool has pivoted cutting blades or plows arranged, when the tool is rotated forward, to be moved pivotally outward, so as to increase the diameter of the boring tool, and to be automatically folded or moved pivotally inward when the tool is rotated backward, so as to decrease the diameter of the boring tool. Otherwise stated, the tool is made radially expansible and contractible, so that when its cutting blades or plows are folded inward, the tool may be inserted through a tube, and when it is expanded for operation, will bore a hole larger than the diameter of the exterior of the tube. Furthermore, the pivoted plow blades are arranged to open and fold by pivotal movements approximately in the same horizontal plane, or in other words, in a plane that is at a right angle to the axis of rotation of the tool. The boring tool comprises an upright shaft 10 having radial arms 11, which, on their front edges, are beveled, so that they assist in the cutting action. Furthermore, these blades are preferably set so that, in cross section, they incline slightly forward in respect to the direction of the rotation of the tool in the cutting action. So-called plow blades 12 are pivoted to the arms 11 at 12$^a$, and, when turned outward into operative positions, as shown by full lines in Fig. 1, project a very considerable distance beyond the outer ends of the arms 11, and which, when turned inward, as indicated by dotted lines in Fig. 1, are folded or carried within the circular line of travel of the outer ends of the said arms. When the plow blades 12 are turned outward, they strike against stop shoulders 11$^a$ on the arms 11, as best shown in Fig. 2, and are, therefore, adapted to move in one direction only from their out-turned operative positions. Under rotation of the cutting tool in the operative direction, to-wit, in the direction of the arrow marked on Fig. 1, said plow blades will be forced back against the stop shoulders 11$^a$, but under backward rotation of the tool, they will be moved pivotally inward to dotted line position shown in Fig. 1. The arms 11 are also preferably provided with fixed supplemental plow blades 13 fixed to the arms 11 radially inward of the pivoted plow blades 12. The several arms 11 are joined to a common hub that has a centering point 10$^a$. The plow blades 12 are preferably provided with comparatively sharp front edges that follow a waving line, both in a vertical and horizontal direction.

The shaft 10 of the boring tool may, of course, be of any desired length, and so far as the invention is concerned, may be driven in any suitable way, but should, of course, be driven from some suitable source of power, such as an electric motor or an engine.

What I claim is:

1. An expansible and contractible boring tool comprising a shaft having radial arms with beveled front edges, and plow blades pivoted to said arms for inward and outward pivotal movements, the said plow blades when turned outward, projecting beyond the ends of said arms, and said arms having stops limiting the pivotal movements of said plow blades in an outward direction.

2. An expansible and contractible boring tool comprising a shaft having radial arms with beveled front edges, and plow blades pivoted to said arms for inward and outward pivotal movements, the said plow blades when turned outward, projecting beyond the ends of said arms, and said arms having stops limiting the pivotal movements of said plow blades in an outward direction, and supplemental plow blades fixed to said arms inward of said pivoted plow blades and projecting forward of the beveled front edges thereof.

In testimony whereof we affix our signatures in presence of two witnesses.

HENRY SLETTEN.
ALEXANDER N. LIDELL.

Witnesses:
HARRY D. KILGORE,
F. D. MERCHANT.